United States Patent
Henry

(10) Patent No.: US 9,474,070 B2
(45) Date of Patent: Oct. 18, 2016

(54) METHOD AND APPARATUS FOR PROVIDING CHANNEL SHARING AMONG WHITE SPACE NETWORKS

(71) Applicant: AT&T Intellectual Property I, L.P., Atlanta, GA (US)

(72) Inventor: Paul Shala Henry, Holmdel, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 14/985,064

(22) Filed: Dec. 30, 2015

(65) Prior Publication Data

US 2016/0113011 A1    Apr. 21, 2016

Related U.S. Application Data

(63) Continuation of application No. 14/524,869, filed on Oct. 27, 2014, now Pat. No. 9,241,325, which is a continuation of application No. 12/606,626, filed on Oct. 27, 2009, now Pat. No. 8,873,524.

(51) Int. Cl.
| | |
|---|---|
| *H04W 4/00* | (2009.01) |
| *H04W 72/04* | (2009.01) |
| *H04W 36/00* | (2009.01) |
| *H04W 16/14* | (2009.01) |
| *H04W 88/16* | (2009.01) |

(52) U.S. Cl.
CPC ........ *H04W 72/0446* (2013.01); *H04W 16/14* (2013.01); *H04W 36/00* (2013.01); *H04W 72/042* (2013.01); *H04W 72/0413* (2013.01); *H04W 4/00* (2013.01); *H04W 88/16* (2013.01)

(58) Field of Classification Search
CPC .................................................. H04W 36/00
See application file for complete search history.

(56) References Cited

U.S. PATENT DOCUMENTS

| | | | |
|---|---|---|---|
| 5,873,041 A | 2/1999 | Ishii | |
| 6,058,338 A | 5/2000 | Agashe et al. | |
| 6,088,361 A | 7/2000 | Hughes et al. | |
| 6,201,499 B1 | 3/2001 | Hawkes et al. | |
| 6,292,665 B1 | 9/2001 | Hildebrand et al. | |
| 7,495,608 B1 | 2/2009 | Chen et al. | |
| 8,416,134 B2 | 4/2013 | Henry et al. | |
| 8,873,524 B2 * | 10/2014 | Henry ................... | H04W 36/00 370/338 |
| 9,241,325 B2 * | 1/2016 | Henry ............... | H04W 72/0413 |
| 2002/0175855 A1 | 11/2002 | Richton et al. | |
| 2003/0078075 A1 | 4/2003 | McNicol | |
| 2003/0119525 A1 | 6/2003 | Rajkotia | |
| 2004/0127226 A1 | 7/2004 | Dugad et al. | |
| 2005/0030228 A1 | 2/2005 | Judd | |
| 2005/0195103 A1 | 9/2005 | Davis et al. | |
| 2006/0109514 A1 | 5/2006 | Klassen | |
| 2007/0257836 A1 | 11/2007 | Chaplin | |

(Continued)

FOREIGN PATENT DOCUMENTS

| | | |
|---|---|---|
| GB | 2422064 | 7/2006 |
| WO | W/O 9939517 | 8/1999 |
| WO | WO 2009/045646 A2 | 4/2009 |

*Primary Examiner* — John Blanton

(57) ABSTRACT

A method and an apparatus for providing channel sharing are disclosed. For example, the method receives a request for a white space channel assignment, and identifies one or more white space channels in accordance with the request. The method sends a response to the request comprising a white space channel assignment, wherein the white space channel assignment assigns one of the identified one or more white space channels.

19 Claims, 5 Drawing Sheets

(56) References Cited

U.S. PATENT DOCUMENTS

| | | |
|---|---|---|
| 2008/0046978 A1 | 2/2008 | Rieger |
| 2008/0088507 A1 | 4/2008 | Smith et al. |
| 2009/0042581 A1 | 2/2009 | Liu et al. |
| 2009/0047916 A1 | 2/2009 | Haykin |
| 2009/0091494 A1 | 4/2009 | Sugimoto et al. |
| 2009/0117859 A1 | 5/2009 | Smith et al. |
| 2009/0215457 A1 | 8/2009 | Wang et al. |
| 2009/0238107 A1 | 9/2009 | Li et al. |
| 2010/0075704 A1 | 3/2010 | McHenry et al. |
| 2010/0123626 A1 | 5/2010 | Yano |
| 2010/0124254 A1 | 5/2010 | Wu et al. |
| 2010/0238898 A1 | 9/2010 | Chin et al. |
| 2010/0255794 A1 | 10/2010 | Agnew |
| 2010/0271263 A1 | 10/2010 | Moshfeghi |
| 2011/0103317 A1 | 5/2011 | Ribeiro et al. |
| 2011/0116484 A1 | 5/2011 | Henry et al. |
| 2011/0122855 A1 | 5/2011 | Henry et al. |
| 2011/0149778 A1 | 6/2011 | Yu |
| 2011/0170559 A1 | 7/2011 | Zhang et al. |
| 2012/0096498 A1 | 4/2012 | Wu et al. |
| 2013/0178229 A1 | 7/2013 | Henry et al. |

* cited by examiner

METHOD AND APPARATUS FOR PROVIDING CHANNEL SHARING AMONG WHITE SPACE NETWORKS

This application is a continuation of U.S. patent application Ser. No. 14/524,869, filed Oct. 27, 2014, now U.S. Pat. No. 9,241,325, and is a continuation of U.S. patent application Ser. No. 12/606,626, filed Oct. 27, 2009, now U.S. Pat. No. 8,873,524, all of which are herein incorporated by reference in their entirety.

The present disclosure relates generally to communication networks and, more particularly, to a method and apparatus for providing channel sharing among white space networks, e.g., among white space networks communicating over an Internet Protocol (IP) network, an IP Multimedia Subsystem (IMS) network, and the like.

BACKGROUND

A user may wish to use a frequency that is unlicensed for broadcast television for communication within a local area network. For example, the user may wish to use a white space channel (e.g., an unused channel in the spectrum that is allocated for television broadcasting), for communication. However, two or more devices may autonomously select the same white space channel from among a plurality of available white space channels. This will create interference between various users of such white space channels.

SUMMARY

In one embodiment, the present disclosure describes a method and an apparatus for providing white space channel sharing. For example, the method receives a request for a white space channel assignment, and identifies one or more white space channels in accordance with the request. The method sends a response to the request comprising a white space channel assignment, wherein the white space channel assignment assigns one of the identified one or more white space channels.

In one alternate embodiment, the method sends a request for a white space channel assignment by a gateway. The method then receives a response to the request, where the response comprises a white space channel that is available based on a location of the gateway.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly describes a method and apparatus for providing channel sharing among networks, e.g., white space networks. Although the present disclosure is discussed below in the context of white space networks communicating with IP networks, e.g., Internet Protocol (IP) Multimedia Subsystem (IMS) networks, the present disclosure is not so limited. Namely, the present disclosure can be applied to packet networks in general, e.g., Voice over Internet Protocol (VoIP) networks, Service over Internet Protocol (SoIP) networks, and the like. More broadly, this disclosure refers to white space networks communicating over any type of networks that allow connection with a geo-location database as further described below.

Figure 1:
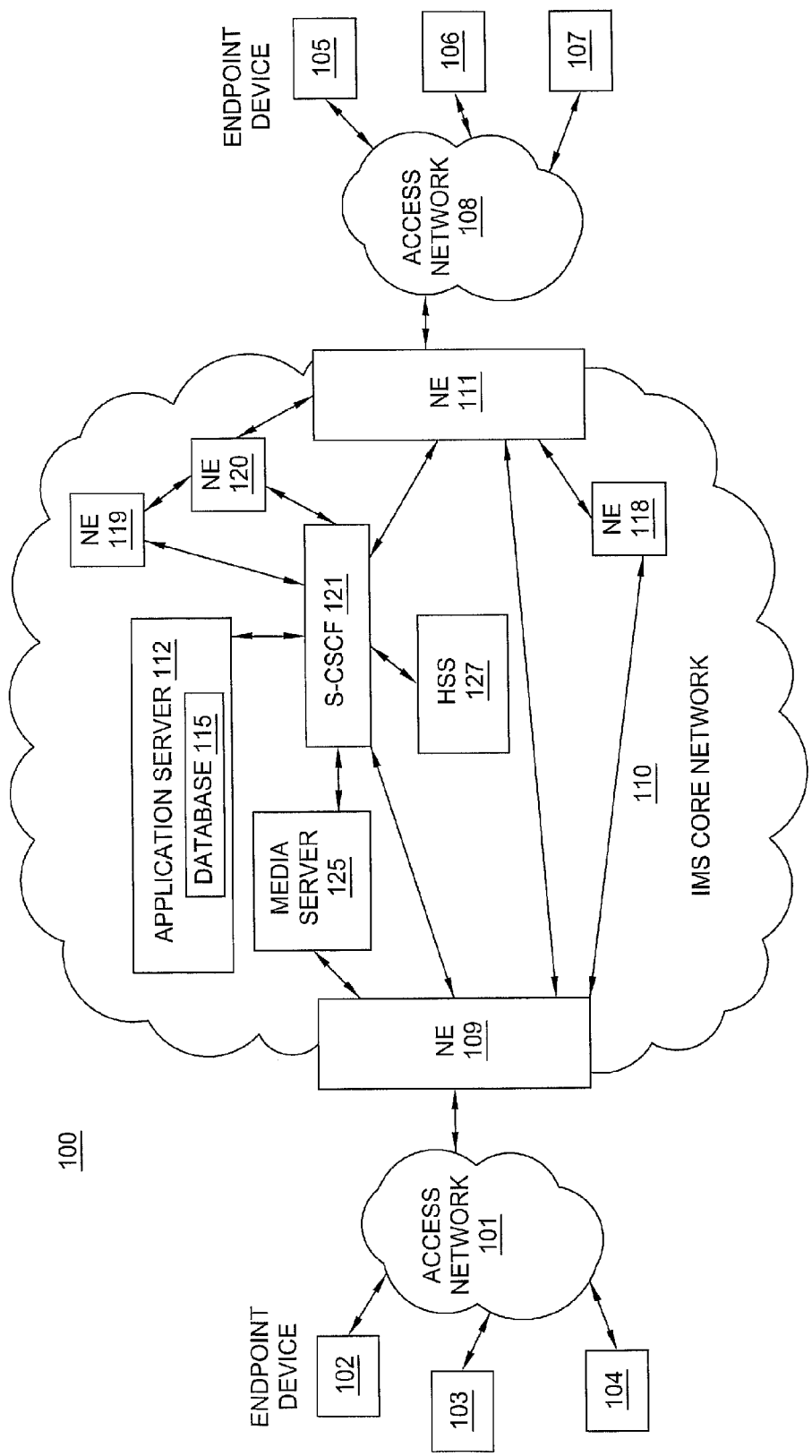
FIG. 1 illustrates an exemplary network related to the present invention.

To better understand the present invention, FIG. 1 illustrates an example network 100, e.g., an Internet Protocol (IP) Multimedia Subsystem network related to the present invention. An IP network is broadly defined as a network that uses Internet Protocol to exchange data packets. Exemplary IP Multimedia Subsystem (IMS) networks include Internet protocol (IP) networks such as Voice over Internet Protocol (VoIP) networks, Service over Internet Protocol (SoIP) networks, and the like.

In one embodiment, the network 100 may comprise a plurality of endpoint devices 102-104 configured for communication with the core IMS network 110 (e.g., an IP based core backbone network supported by a service provider) via an access network 101. Similarly, a plurality of endpoint devices 105-107 are configured for communication with the IMS core packet network 110 via an access network 108. The network elements 109 and 111 may serve as gateway servers or edge routers for the network 110.

The endpoint devices 102-107 may comprise customer endpoint devices such as personal computers, laptop computers, Personal Digital Assistants (PDAs), mobile phones, smart phones, and the like. The access networks 101 and 108 serve as a conduit to establish a connection between the endpoint devices 102-107 and the Network Elements (NEs) 109 and 111 of the IMS core network 110. The access networks 101 and 108 may each comprise a Digital Subscriber Line (DSL) network, a broadband cable access network, a Local Area Network (LAN), a Wireless Access Network (WAN), a $3^{rd}$ party network, a cellular network, and the like. The access networks 101 and 108 may be either directly connected to NEs 109 and 111 of the IMS core network 110, or indirectly through another network.

Some NEs (e.g., NEs 109 and 111) reside at the edge of the IMS core infrastructure and interface with customer endpoints over various types of access networks. An NE that resides at the edge of a core infrastructure is typically implemented as an edge router, a media gateway, a proxy server, a border element, a firewall, a switch, and the like. An NE may also reside within the network (e.g., NEs 118-120) and may be used as a SIP server, an application server, a core router, or like device.

The IMS core network 110 also comprises a Home Subscriber Server (HSS) 127, a Serving—Call Session Control Function (S-CSCF) 121, a Media Server (MS) 125, and an Application Server 112 that contains a database 115. The S-CSCF of the calling party and the S-CSCF of the called party are also referred to as the originating S-CSCF and the terminating S-CSCF, respectively. An HSS 127 refers to a network element residing in the control plane of the IMS network that acts as a central repository of all customer specific authorizations, service profiles, preferences, etc.

The S-CSCF 121 resides within the IMS core infrastructure and is connected to various network elements (e.g., NEs 109 and 111) using the Session Initiation Protocol (SIP) over the underlying IMS based core backbone network 110. The S-CSCF 121 may be implemented to register users and to provide various services (e.g., VoIP services). The S-CSCF interacts with the appropriate VoIP/SoIP service related applications servers (e.g., 112) when necessary. The S-CSCF 121 performs routing and maintains session timers. The S-CSCF may also interrogate an HSS to retrieve authorization, service information, user profiles, etc. In order to complete a call that requires certain service specific features, the S-CSCF may need to interact with various application servers (e.g., various VoIP servers). For example, the S-CSCF may need to interact with another server for translation of an E.164 voice network address into an IP address, and so on.

The Media Server (MS) 125 is an application server that typically handles and terminates media streams to provide services such as announcements, bridges, and Interactive Voice Response (IVR) messages for VoIP service applications. The media server also interacts with customers for media session management to accomplish tasks such as process requests.

The application server 112 may comprise any server or computer that is well known in the art, and the database 115 may be any type of electronic collection of data that is also well known in the art. It should be noted that the communication system 100 may be expanded by including additional endpoint devices, access networks, network elements, application servers, etc. without altering the scope of the present invention. The above IP network is only described to provide an illustrative environment in which packets for voice, data, and multimedia services are transmitted on networks.

The United States Federal Communications Commission (FCC) has released unused portions of the spectrum in the frequency range of 54 MHz-698 MHz, which were previously reserved for television broadcasts, for use without a license. A channel that allows unlicensed use in this frequency range is referred to as a white space channel. A user may wish to use a channel in the unlicensed spectrum for communication within a local area network of the user. For example, a user may want to use the white space channel for local use, e.g., in a local area network that interconnects a plurality of networked devices throughout the home of the user. The white space channels are attractive for communication because the transmitted signals travel long distances and are able to penetrate structures, e.g., walls in buildings and so on. However, In order to prevent interference with licensed channels, e.g., television broadcasts, in the same spectrum, and other users who are also interested in using the available white space channels, spectrum sensing technology can be employed.

Sensing technology refers to a technology that enables a device to determine if there is transmission on a particular channel at a particular time. The spectrum sensing enables the device to identify available channels at a specific time. Once the available channels are identified, the device makes a selection of a channel from among the channels identified as being available. However, by the time the device starts transmitting on the selected channel, the channel may suddenly become unavailable. For example, each of a plurality of devices may run its own spectrum sensing method and identify a channel as being available. As a result, it is possible that the plurality of devices may actually select the same channel, thereby resulting in interference. In another example, spectrum sensing may be performed during a period of inactivity by a licensed user such a broadcasting television station temporarily off the air. That is, the channel may in-fact be licensed, but appears to a device to be an unlicensed white space channel. When the activity by the licensed user resumes, interference may occur.

In one embodiment, the current method enables a network service provider to enable white space channel sharing among various networks, e.g., white space networks. For example, a customer of the service provider may implement a White Space Local Area Network (WSLAN) to enable communication among a plurality of networked devices, e.g., deployed at the customer premises, e.g., a home or an office (broadly a local location of a user). For example, the customer may have one or more computers, printers, messaging devices, data input/output devices, set top boxes, gaming consoles, and the like that need to communicate wirelessly and exchange packets. The customer may then prefer to implement a WSLAN to enable the one or more devices to communicate via a white space channel (i.e., an unlicensed channel).

In one embodiment, the customer may then implement a WSLAN gateway for communicating with a geo-location database. A geo-location database contains the physical locations of licensed users and their associated licensed channels. For example, a local television station will register its spectrum (i.e., licensed channel(s) and broadcast location (s)) such that other devices are able to avoid using the licensed channels. To illustrate, a particular channel (e.g., channel 40) may be a licensed channel in one geographical location, e.g., Denver, Colo., but may be an unlicensed white space channel in another geographical location, e.g., Orlando, Fla.

As such, in one embodiment, a WSLAN gateway may interact with a geo-location database to identify the channels that are not being used by licensed users and then make a white space channel selection. For example, the WSLAN of a particular customer may communicate with the geo-location database over a communication network, e.g., the Internet, an IMS network, and the like, to access the information stored on the geo-location database. In one embodiment, the WSLAN gateway is also capable of determining its own physical location, e.g., through initial setup configuration or the subsequent use of Global Positioning System (GPS) technology and the like. For example, the WSLAN gateway is able to determine its own latitude and longitude to within 50 meters of accuracy.

In one embodiment, the current method enables the network service provider to provide white space channel sharing among a plurality of customers, wherein each customer implements a WSLAN. For example, a white space usage manager can be implemented by the network service provider or a third party. Broadly, the white space usage manager (e.g., implemented as an application server) is designed to optimize spectrum resource usage among WSLANs that are serviced by the white space usage manager. More specifically, the optimization allows usage of available white space channels by various WSLANs in a coordinated manner to minimize interference.

In one embodiment, the optimization of the spectrum resource usage comprises optimizing channel selection for each of the WSLANs. For example, if there is a plurality of unlicensed white space channels available for a location, the white space usage manager will selectively assign the unlicensed channels, such that adjacent WSLANs will not use the same channel. Namely, the white space usage manager leverages its overall knowledge of the white space channels that have already been assigned to effect a frequency re-use that prevents the same channel from being used by adjacent WSLANs. In fact, the white space usage manager might even re-assign the channel "mid-stream" for an operating WSLAN under certain conditions in order to optimize overall spectrum use.

In one embodiment, the optimization of the spectrum resource usage comprises a coordination of transmission times among WSLANs that use the same channel. For example, two or more adjacent WSLANs (e.g., within a 200 m distance) may each have a need for using a white space channel for packet transmission, but the number of packets for each transmission may actually be small. A single white space channel may then be shared by the two or more WSLANs by ensuring that the transmission times are coordinated in a manner to avoid overlapping transmissions.

In one embodiment, the white space usage manager may assign a single white space channel to two or more non-adjacent WSLANs that are separated by a sufficient distance that will ensure that interference will not result from the use of the same white space channel by multiple non-adjacent WSLANs. In other words, the white space usage manager will use the location information reported by the WSLAN gateways of the various WSLANs to ensure proper white space channel assignment. Broadly, it should be noted that "adjacent" and "non-adjacent" is intended to be defined by an amount of relative distance separating two WSLANs and does not mean that the WSLANs are physically next to each other. In other words, for example if two WSLANs are using the same channel and there is interference between the two WSLANs, then the two WSLANs can be deemed to be adjacent. Whereas, if two WSLANs are using the same channel and there is no interference between the two WSLANs, then the two WSLANs can be deemed to be non-adjacent.

In one embodiment, the network service provider is tasked with the management of the limited availability of white space channels. For example, in some locations, the network service provider or a third party operating the white space manager may determine that there are only a limited number of unlicensed channels to meet the demand of a large number of customers who are requesting the usage of white space channels. In such a scenario, the network service provider may have to exercise a greater degree of coordination. For example, the network service provider may coordinate the transmission times to allow sharing of a single channel among adjacent WSLANs. In another example, the network service provider may determine the bandwidth needs of the various WSLANs before channel assignment. By knowing the bandwidth needs, the white space usage manager, may enable two adjacent WSLANs, each of which has a limited bandwidth need, to share a single channel. In turn, the white space usage manager may allow another available channel to be used by a customer with a higher bandwidth transmission need. That is, the white space usage manager is able to optimize the usage of available spectrum resources by as many customers as possible while ensuring that such white space spectrum usage will not cause any interference.

In operation, each gateway for a WSLAN communicates with the white space usage manager to request a channel for use by the particular WSLAN that the gateway serves. In one embodiment, the request may comprise one or more of: a physical location of the WSLAN or WSLAN gateway (e.g., latitudinal and longitudinal information), a desired time duration of use of the channel for packet transmission, bandwidth requirements (e.g., the estimated number of packets to be transmitted, the packet transmission rate, and the like) and so on.

The white space usage manager may then receive the request from the gateway for the WSLAN and communicate with a geo-location database to identify one or more unlicensed channels that are available for selection at the physical location of the WSLAN. For example, the request includes the physical location of the WSLAN and/or the gateway itself. The white space usage manager then selects an available channel for the WSLAN and notifies the gateway serving the WSLAN. For example, the white space usage manager sends a response to the gateway identifying a particular channel that the WSLAN may use.

In one embodiment, the response to the gateway may also comprise a transmission time (broadly a time duration that the channel is assigned for use to a particular customer). For example, if the channel is also being used by another WSLAN, the response may include transmission time intervals or transmission time sequences to allow coordination among WSLANs that are sharing the same channel, without causing interference.

In one embodiment, the response to the gateway may comprise a request to the gateway to notify the white space usage manager when the transmission is completed. In other words, the white space usage manager is requesting that the gateway provide an affirmative notification that the previously assigned channel is no longer needed. For example, the white space usage manager may release the channel for use to second WSLAN when notified of completion of a transmission by a first WSLAN that was previously assigned the channel or a time slot associated with the assigned channel.

In one embodiment, the white space usage manager may queue requests for channels and/or timeslots such that channels and/or timeslots are assigned as they become available. For example, a gateway for a WSLAN that was previously assigned a channel may notify the white space usage manager that the task (transmission) is completed. The white space usage manager may then assign the channel or timeslot to another WSLAN.

In one embodiment, a channel or a transmission timeslot may be assigned for the duration that the gateway requested and automatically released at the end of the requested duration. In other words, the white space usage manager may indicate to the gateway that the channel is assigned to a particular WSLAN for only a predefined time interval. At the end of the predefined interval, the particular WSLAN is expected to cease its use of the assigned channel, and the white space usage manager is free to re-assign the channel to another WSLAN.

In one embodiment, the white space usage manager enables a WSLAN gateway to request an extension of time for using a white space channel. For example, an initial request may be for using a white space channel for one minute. However, at a later time, the gateway may determine that the task will not be completed within the requested transmission time. The gateway may then send another request to the white space usage manager for an extension of time. The white space usage manager may then analyze the request, and extend the time or assign a new channel such that the task can be completed.

In one embodiment, the white space usage manager can be implemented as an application server in communication with the WSLANs via the service provider's network. For example, the white space usage manager can be an application server implemented by the service provider for optimizing usage of white space spectrum resources for customers of the service provider.

In one embodiment, the white space usage manager may interact with a designated WSLAN among a plurality of WSLANs that are located within a predetermined area. For example, one of the WSLAN gateways can be designated by the other WSLAN gateways in the same neighborhood for coordinating usage of spectrum resources. For example, each WSLAN in the neighborhood may send its physical location to the designated gateway. The designated gateway may then identify unlicensed channels by communicating with the white space usage manager and/or a geo-location database. The designated gateway may then coordinate with each WSLAN in the neighborhood with respect to available channels or time slots in each available channel, thereby ensuring that no WSLANs will cause unnecessary interference. This will alleviate the management burden of the white space usage manager and allows local or distributed white space spectrum coordination.

Figure 2:
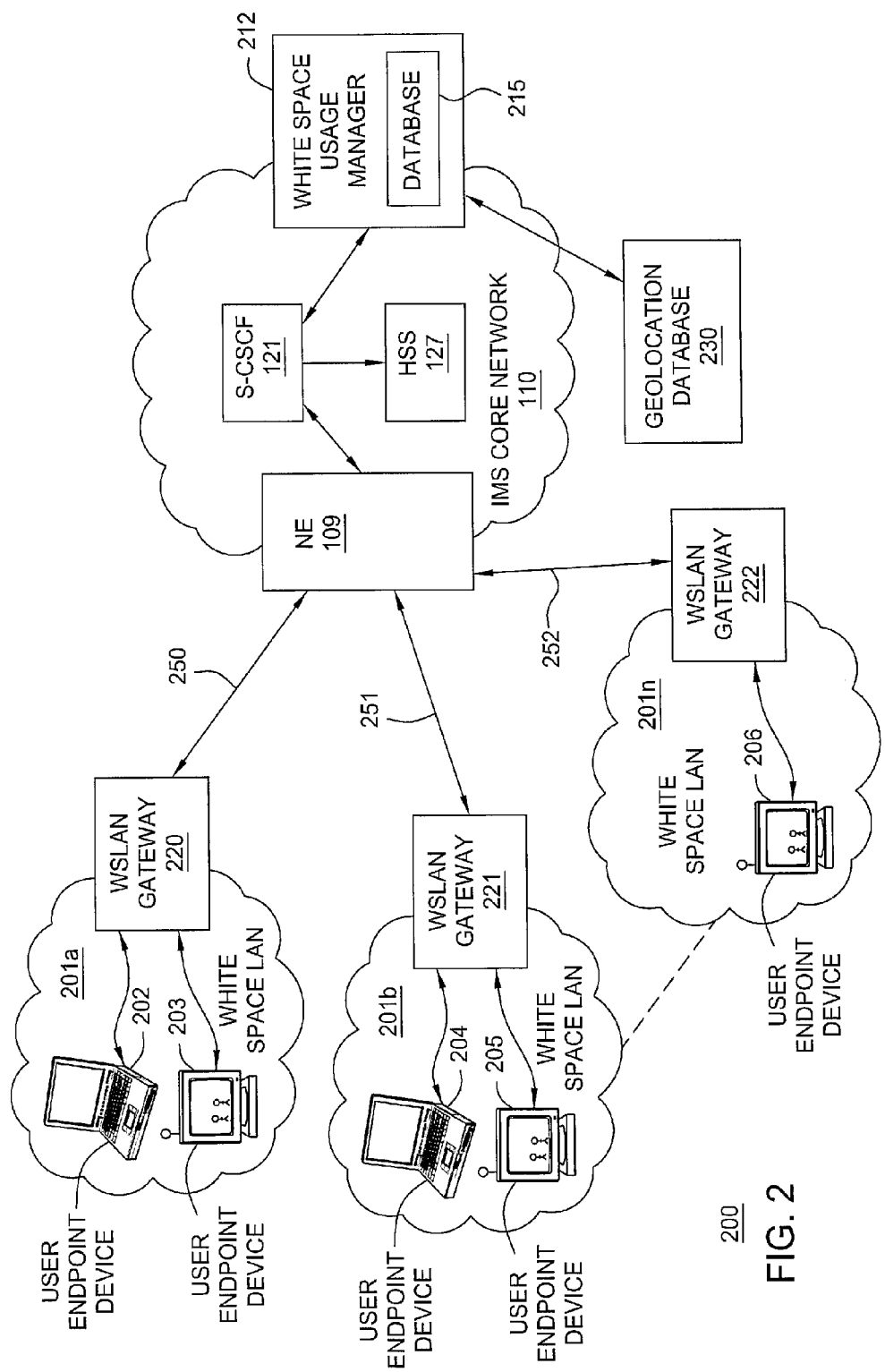
FIG. 2 illustrates an exemplary network in accordance with one embodiment of the current disclosure for providing channel sharing among white space networks.

FIG. 2 illustrates an exemplary network 200 in accordance with one embodiment of the current disclosure for providing channel sharing, e.g., among white space networks. In one embodiment, the network 200 comprises User Endpoint (UE) devices 202-206 communicating with an IMS network 110 to access a service with white space channel sharing, e.g., via white space LAN 201a, 201b, or 201n. The white space LAN 201a comprises UE devices 202 and 203 and WSLAN gateway 220. The UE devices 202 and 203 communicate with the IMS network 110 via the WSLAN gateway 220 and NE 109. The white space LAN 201b comprises UE devices 204 and 205 and WSLAN gateway 221. The UE devices 204 and 205 communicate with the IMS network 110 via the WSLAN gateway 221 and NE 109. The white space LAN 201n comprises UE device 206 and WSLAN gateway 222. The UE device 206 communicates with the IMS network 110 via the WSLAN gateway 222 and NE 109. For illustration, the IMS core network comprises an NE 109, an S-CSCF 121, HSS 127, a white space usage manager 212 and a database 215.

It should be noted that although the WSLAN gateway 220 is illustrated as a separate module in FIG. 2, the present disclosure is not so limited. In other words, the WSLAN gateway need not be physically distinct from the UE devices. In WSLAN 201a, for example, the gateway could be a program running on the computer 203 and so on.

It should be noted that the IMS network 110 and the white space LANs may comprise any number of other network devices. For clarity reasons, the present disclosure only includes those components that are used to describe the various embodiments as discussed above.

It should also be noted that the WSLANs 201a, 201b and 201n may communicate with the IMS 110 via a variety of different communications media and different network elements that reside at the edge of the IMS core network. For example, communication links 250, 251 and 252 may be wireless network based, wire based, etc.

In one embodiment, a customer of the network service provider may then subscribe to a channel sharing service via a user endpoint device communicating with an HSS 127 via a respective WSLAN gateway and NE 109. For example, a user with the endpoint device 202 may subscribe to a channel sharing service by communicating with the HSS 127 located in the IMS core network 110 via the WSLAN gateway 220. Similarly, users of the WSLAN 201b and 201n may also subscribe to the channel sharing service. Broadly, the "user" is to be interpreted to include an owner of the WSLAN. As such, in one embodiment, it is the owner of the WSLAN gateway who would subscribe to the channel-sharing service, rather than the separate owners or users of the UE devices.

The WSLAN gateways 220-222 interact with the white space usage manager 212 to identify an available white space channel and/or timeslot for transmission. For example, the WSLAN gateway 220 may send a request for an available white space channel or timeslot to the white space usage manager. The request may comprise one or more of: a location of the WSLAN or WSLAN gateway, a time duration of transmission, a type of request (e.g., an extension of a previous request, a new request, etc.), a bandwidth need (e.g., number of packets to be transmitted, rate of packet transmission, etc.).

In one embodiment, the white space usage manager 212 interacts with a geo-location database 230 to identify available unlicensed channels (or alternatively licensed channels that cannot be used) in accordance with the received request. For example, the unlicensed channels can be identified based on the location of the requesting WSLAN gateway. The white space usage manager 212 may then analyze the response from the geo-location database, the request from the WSLAN gateway 220, and a database of assigned white space channels and timeslots to determine a list of white space channels or timeslots that are available for assignment. For example, the white space usage manager may maintain a database of known white space channel and/or timeslot assignments in the database 215. The white space usage manager 212 then determines an optimal assignment based on the overall knowledge. For example, among available channels, the white space usage manager 212 may assign different channels to adjacent WSLANs. For example, if the known locations for WSLAN gateways 220 and 221 are such that the WSLANs are unable to share the same channel, the white space usage manager will assign the WSLAN gateways 220 and 221 different channels.

The white space usage manager 212 may then provide a response to the WSLAN gateway, wherein the response comprises an optimally assigned channel or timeslot. The response may further comprise one or more of: an assigned transmission time or duration, a request for notification when transmission on the white space channel is completed, etc.

The WSLAN gateway 220 may then receive the response from the white space usage manager and notify the respective user endpoint device(s) of the white space channel/timeslot assignment. The user endpoint devices may then use the white space channel for transmission in accordance with the requirements specified in the response received from the white space usage manager 212. If an extension of time, a new request, etc. is needed, the WSLAN gateway may then send another request (e.g., based on current need) to the white space usage manager.

In one embodiment, the white space usage manager is located in the service provider's network. For example, the white space usage manager may be implemented in an application server managed by the service provider. In another embodiment, the white space usage manager may be external to the network that is managed by the service provider. The service provider may then access the white space usage manager as needed via a communication link. However, if the white space usage manager is operated by a third party other than the service provider, then it is the third party that will access the white space usage manager and the service provider is simply providing a connection between the WSLAN gateway and the white space usage manager.

In one embodiment, if the WSLANs 201*b* and 201*n* are deemed to be connected via a path independent of network 110, then the WSLANs 201*b* and 201*n* can implement local coordination as discussed above. In other words, one of the WSLAN gateways 221 or 222 can be a designated gateway for coordinating the usage of available white space spectrum through local communications (shown as a dashed line) between the two adjacent WSLANs 201*b* and 201*n*.

Figure 3:
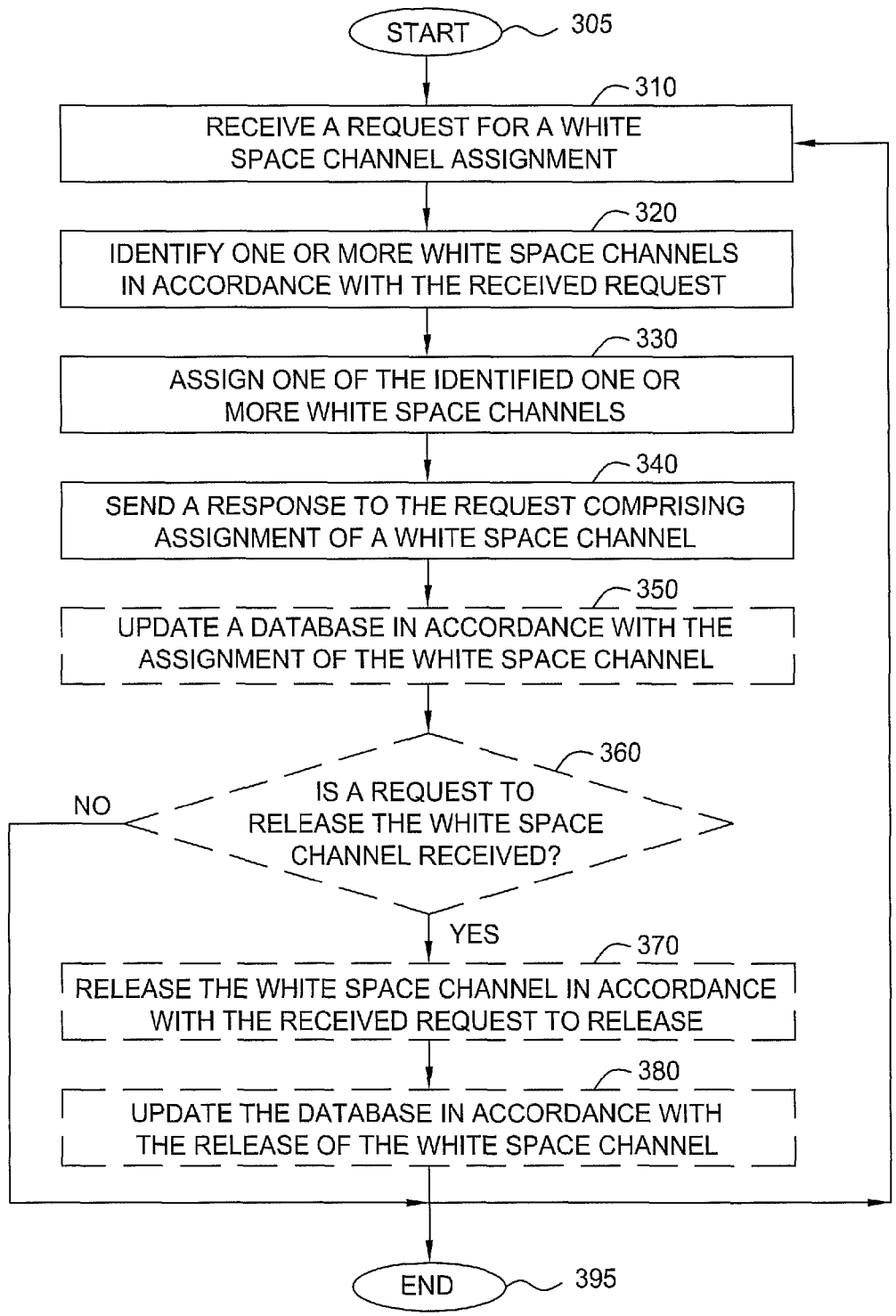
FIG. 3 illustrates a flowchart of a method for providing channel sharing among white space networks.

FIG. 3 illustrates a flowchart of a method 300 for providing channel sharing, e.g., among white space networks. In one embodiment, one or more steps of method 300 for sharing white space channels can be implemented in an application server. Method 300 starts in step 305 and proceeds to step 310.

In step 310, method 300 receives a request for a white space channel assignment. For example, the method may receive a request for a white space channel assignment from a WSLAN gateway serving a WSLAN of a customer.

In one embodiment, the request may comprise one or more of: a location of the WSLAN or WSLAN gateway, a duration of transmission, a type of request (e.g., an extension of a previous request, a new request, etc.), a bandwidth need (e.g., number of packets to be transmitted, packet transmission rate, etc.).

In step 320, method 300 identifies one or more white space channels in accordance with the received request. For example, the licensed channels and their locations are registered in the geo-location database 230. The method may then interact with the geo-location database to identify available unlicensed channels for a location identified in the request. For example, the method may identify a channel as being a white space channel if it is not registered in the geo-location database as a licensed channel.

In step 330, method 300 assigns one of the identified one or more white space channels. For example, the method may analyze the response received from the geo-location database to identify a list of white space channels for a physical location in accordance with the request. The method may also obtain a record of white space channels that are already assigned and/or being used. For example, the method may maintain a database of assignments and retrieve the data for analysis. The method then determines an optimal assignment based on the overall knowledge of the white space channels that are assigned, proximity to other white space users (same or different channel), desired duration of transmission, bandwidth (e.g., packet size), etc. In one example, among available channels, the method may assign different channels to adjacent white space users.

In one embodiment, the assignment may comprise assigning a timeslot on a white space channel to each of a plurality of users such that the channel is shared by the plurality of users by enabling each user to transmit on the shared channel during only an assigned timeslot. For example, the method may assign different timeslots on the same white space channel to a plurality of users such that the same channel is shared by the plurality of users by having each of the plurality of users limiting their respective transmission to a specific assigned timeslot.

In step 340, method 300 sends a response to the request comprising an assignment of a white space channel. For example, the method may send an optimally assigned channel or timeslot. In one embodiment, the response may comprise one or more of an assigned transmission timeslot, a transmission duration, a request for notification when transmission is completed, etc.

In optional step 350, method 300 updates a database 215 in accordance with the assignment of the white space channel. For example, if a channel has just been assigned at a location, the method updates the database such that the updated data can be used during a subsequent analysis. The method may then proceed to an optional step 360.

In optional step 360, method 300 determines if a request to release the white space channel is received. For example, a customer may have completed the communication using the assigned white space channel. At the conclusion of the communication, the customer may then send a notification such that the channel may be assigned for other requests. Alternatively, an internal timer can be used to determine whether a transmission time or duration has elapsed such that a previously assigned white space channel can be released for re-assignment. If a request to release the white space channel is received, the method proceeds to step 370. Otherwise, the method proceeds to step 395 to end processing the current request or returns to step 310 to continue receiving requests.

In optional step 370, method 300 releases the white space channel in accordance with the received request to release. The method then proceeds to step 380.

In optional step 380, method 300 updates the database in accordance with the release of the white space channel. The method then proceeds to step 395 to end processing the current request or returns to step 310 to continue receiving requests.

Figure 4:
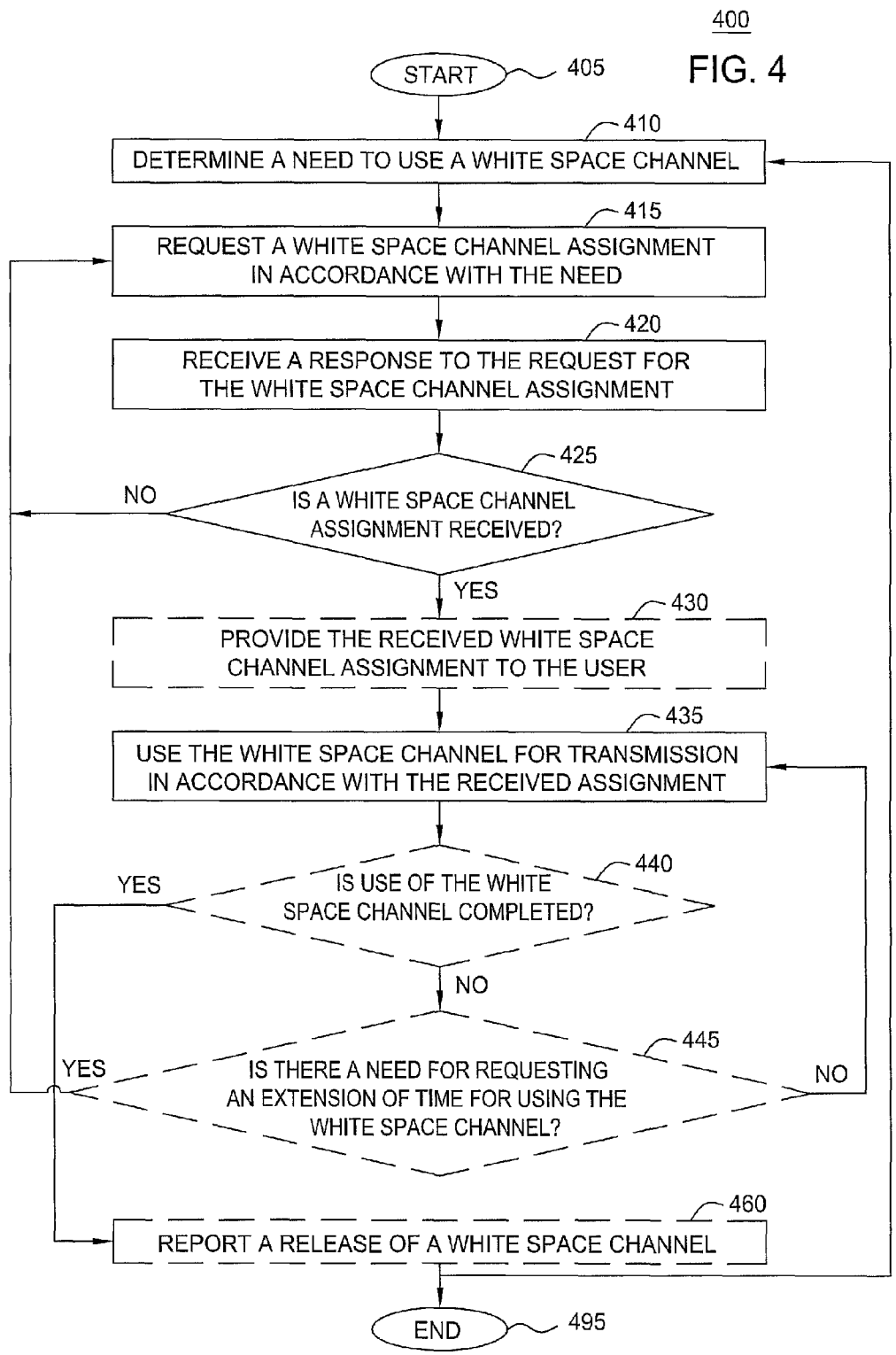
FIG. 4 illustrates a flowchart of a method for channel sharing by a white space network.

FIG. 4 illustrates a flowchart of a method 400 for channel sharing by a white space network. In one embodiment, one or more steps of method 400 for sharing white space channels can be implemented in a network device serving as a gateway for a white space LAN. Method 400 starts in step 405 and proceeds to step 410.

In step 410, method 400 determines a need to use a white space channel. For example, a gateway for a WSLAN may receive a request for a white space channel from a user endpoint device in the WSLAN for packet transmission. The gateway may then assess the need by identifying the necessary bandwidth, duration of transmission, etc. For example, if the user endpoint device needs to send a file to a printer on the WSLAN, the gateway can assess the size of the file to be printed, thereby determining the needed bandwidth and/or the estimated transmission time.

In step 415, method 400 requests a white space channel assignment in accordance with the need. For example, the method may send a request to a white space usage manager of the customer's service provider or to a third party. In one embodiment, the request may comprise one or more of: a location of the WSLAN, a duration of transmission, a type of request (e.g., an extension of a previous request, a new request, etc.), a bandwidth need (e.g., number of packets to be transmitted, rate of packet transmission, etc.).

In step 420, method 400 receives a response to the request for the white space channel assignment. The method then proceeds to step 425.

In step 425, method 400 determines if a white space channel assignment is received. If a white space channel assignment is received, the method proceeds to optional step 430. Otherwise, the method proceeds to step 415 where another request is made.

In one example, a white space channel is available and the request comprises an assignment. In one example, a white space channel is unavailable and the response comprises a denial of request (rejection). In one example, a white space channel is available for a future duration, wherein the duration is assigned. For example, a channel may be expected to be freed and the assignment may be made based on a queue of requests. In one example, a white space channel may be assigned for sharing with other WSLANs based on assignment of specific timeslots. That is, each user may transmit in specific timeslots allowing the channel to be shared among a plurality of WSLANs.

In optional step 430, method 400 provides the received white space channel assignment to the user. For example, the gateway may provide the white space channel assignment (e.g., channel, duration, timeslot, etc. as needed) to the user endpoint device that originated the request. In one embodiment, the gateway may actually be the requesting device that needed to use the white space channel. In that case, the gateway will not need to forward the assignment of the white space channel to another network device.

In step 435, method 400 uses the white space channel for transmission in accordance with the received assignment. For example, the method may use the specific white space channel (frequency) that it is assigned for a duration that is assigned.

In optional step 440, method 400 determines if use of the white space channel is completed. For example, a computer may send requests to a printer in the same WSLAN using the assigned white space channel and the printing job has completed. If the usage of the white space channel is completed, the method proceeds to optional step 460. Otherwise, the method proceeds to step 445.

In optional step 445, method 400 determines if there is a need for requesting an extension of time for using the white space channel. For the example above, the printing time may be taking longer than the time duration in the original request. If there is a need for requesting for an extension of time, the method proceeds to step 415. Otherwise, the method proceeds to step 435.

In optional step 460, method 400 reports a release of a white space channel. For the example above, the method may finish printing. The method then notifies the service provider such that the channel is made available for another assignment. In one embodiment, reporting of a release may have been requested by the service provider, e.g., by a white space usage manager of the service provider. In one embodiment, the release is sent to relinquish the white space channel assignment such that availability of channels for all users may be improved (e.g., via an honor system). The method may then proceed to step 495 to end processing the current white space channel request or return to step 410 to determine other white space channel needs.

It should be noted that although not specifically specified, one or more steps of method 300 or method 400 may include a storing, displaying and/or outputting step as required for a particular application. In other words, any data, records, fields, and/or intermediate results discussed in the method can be stored, displayed and/or outputted to another device as required for a particular application. Furthermore, steps or blocks in FIG. 3 or FIG. 4 that recite a determining operation or involve a decision, do not necessarily require that both branches of the determining operation be practiced. In other words, one of the branches of the determining operation can be deemed as an optional step.

Figure 5:
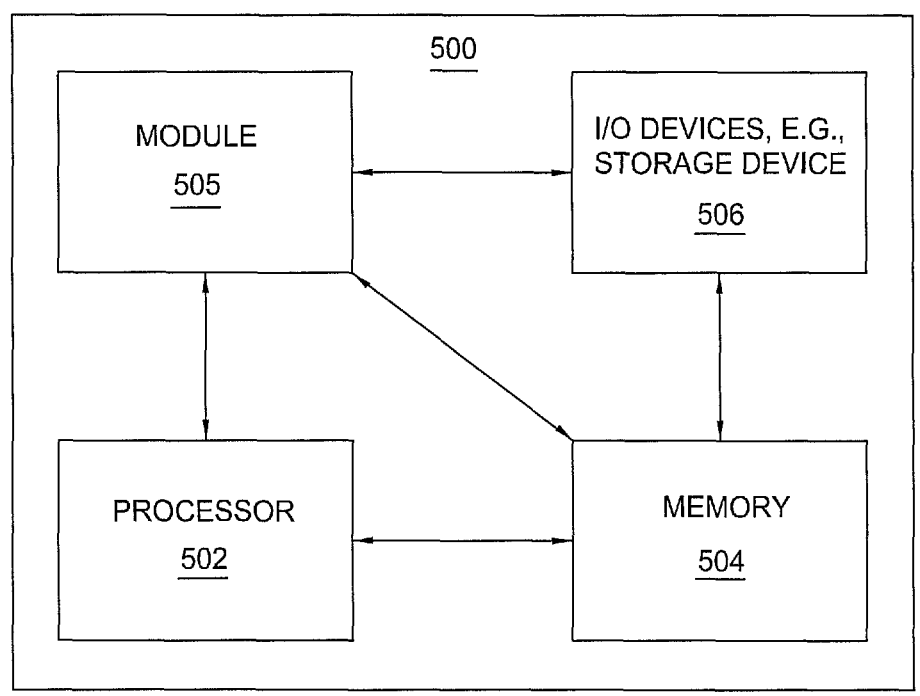
FIG. 5 illustrates a high-level block diagram of a general-purpose computer suitable for use in performing the functions described herein.

FIG. 5 depicts a high-level block diagram of a general-purpose computer suitable for use in performing the functions described herein. As depicted in FIG. 5, the system 500 comprises a processor element 502 (e.g., a CPU), a memory 504, e.g., random access memory (RAM) and/or read only memory (ROM), a module 505 for providing channel sharing, and various input/output devices 506 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present disclosure can be implemented in software and/or in a combination of software and hardware, e.g., using application specific integrated circuits (ASIC), a general purpose computer or any other hardware equivalents. In one embodiment, the present module or process 505 for providing channel sharing among white space networks can be loaded into memory 504 and executed by processor 502 to implement the functions as discussed above. As such, the present method 505 for providing channel sharing (including associated data structures) of the present disclosure can be stored on a computer readable storage medium, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. An application server of a network service provider comprising:
   a processor; and
   a computer-readable medium storing a plurality of instructions which, when executed by the processor, cause the processor to perform operations, the operations comprising:
      receiving a request for a white space channel assignment;
      identifying a white space channel in accordance with the request;
      sending a response to the request, the response comprising the white space channel assignment, wherein the white space channel assignment assigns a timeslot of the white space channel that is identified for sharing the white space channel, wherein the white space channel that is identified is used by a plurality of users; and
      releasing the white space channel in accordance with an elapsed time period associated with the timeslot that has been assigned.

2. The application server of claim 1, the operations further comprising:
   updating a database in accordance with the releasing of the white space channel.

3. The application server of claim 1, the operations further comprising:
   updating a database in accordance with the white space channel assignment of the white space channel.

4. The application server of claim 1, wherein the request comprises a duration of transmission.

5. The application server of claim 1, wherein the request comprises a type of request.

6. The application server of claim 5, wherein the type of request comprises an extension request of a previous request.

7. The application server of claim 1, wherein the request comprises a bandwidth need.

8. A non-transitory computer-readable storage medium storing a plurality of instructions which, when executed by a processor of a gateway, cause the processor to perform operations for sending a request for a white space channel assignment, the operations comprising:

sending the request for the white space channel assignment, wherein the request is sent to a network service provider, wherein the gateway is located at a local location of a user, wherein the gateway is for coordinating a use of the white space channel assignment to support a plurality of devices to communicate wirelessly at the local location of the user; and receiving a response to the request, where the response comprises a white space channel that is available based on a location of the gateway and a timeslot for sharing the white space channel, wherein the timeslot is associated with the white space channel that is available, wherein the white space channel that is available is used by a plurality of users, wherein the plurality of users comprises the user, wherein the white space channel is released in accordance with an elapsed time period associated with a time duration assigned to the timeslot.

9. The non-transitory computer-readable storage medium of claim 8, wherein the response further comprises the time duration.

10. The non-transitory computer-readable storage medium of claim 9, the operations further comprising:
sending a second request for an extension of time after the time duration has elapsed.

11. The non-transitory computer-readable storage medium of claim 10, the operations further comprising:
receiving a second response permitting the extension of time after the time duration has elapsed.

12. The non-transitory computer-readable storage medium of claim 10, the operations further comprising:
receiving a second response denying the extension of time after the time duration has elapsed.

13. The non-transitory computer-readable storage medium of claim 8, wherein the request comprises a bandwidth need.

14. A gateway comprising:
a processor; and
a computer-readable medium storing a plurality of instructions which, when executed by the processor, cause the processor to perform operations, the operations comprising:
sending a request for a white space channel assignment, wherein the request is sent to a network service provider, wherein the gateway is located at a local location of a user, wherein the gateway is for coordinating a use of the white space channel assignment to support a plurality of devices to communicate wirelessly at the local location of the user; and receiving a response to the request, where the response comprises a white space channel that is available based on a location of the gateway and a timeslot for sharing the white space channel, wherein the timeslot is associated with the white space channel that is available, wherein the white space channel that is available is used by a plurality of users, wherein the plurality of users comprises the user, wherein the white space channel is released in accordance with an elapsed time period associated with a time duration assigned to the timeslot.

15. The gateway of claim 14, wherein the response further comprises the time duration.

16. The gateway of claim 15, the operations further comprising:
sending a second request for an extension of time after the time duration has elapsed.

17. The gateway of claim 16, the operations further comprising:
receiving a second response permitting the extension of time after the time duration has elapsed.

18. The gateway of claim 16, the operations further comprising:
receiving a second response denying the extension of time after the time duration has elapsed.

19. The gateway of claim 14, wherein the request comprises a bandwidth need.

* * * * *